US010146199B2

(12) United States Patent
Majewski et al.

(10) Patent No.: US 10,146,199 B2
(45) Date of Patent: *Dec. 4, 2018

(54) BUILDING CONTROLLER WITH OPERATING SYSTEM INTERACTION THROUGH AN INTEGRATED DISPLAY

(71) Applicant: Honeywell International Inc., Morristown, NJ (US)

(72) Inventors: Joseph Majewski, Strongsville, OH (US); Jeffrey Lucas, Doylestown, OH (US)

(73) Assignee: Honeywell International Inc., Morris Plains, NJ (US)

( * ) Notice: Subject to any disclaimer, the term of this patent is extended or adjusted under 35 U.S.C. 154(b) by 568 days.

This patent is subject to a terminal disclaimer.

(21) Appl. No.: 14/679,742

(22) Filed: Apr. 6, 2015

(65) Prior Publication Data

US 2015/0323917 A1 Nov. 12, 2015

Related U.S. Application Data

(63) Continuation of application No. 13/302,931, filed on Nov. 22, 2011, now Pat. No. 9,026,253.

(51) Int. Cl.
*G06F 19/00* (2018.01)
*G05B 19/042* (2006.01)
(Continued)

(52) U.S. Cl.
CPC ......... *G05B 19/0426* (2013.01); *G05B 15/02* (2013.01); *H04L 12/2803* (2013.01);
(Continued)

(58) Field of Classification Search
CPC G05B 19/0426; G05B 19/0423; G05B 15/02; G06F 3/04847; H04L 12/2803
See application file for complete search history.

(56) References Cited

U.S. PATENT DOCUMENTS 5,086,385 A 2/1992 Launey et al.
5,724,505 A 3/1998 Argade et al.
(Continued)

OTHER PUBLICATIONS

"Niagara AX-3.x User Guide, Technical Document," 436 pages, May 1, 2007.
(Continued)

*Primary Examiner* — Michael D Masinick
(74) *Attorney, Agent, or Firm* — Seager Tufte & Wickhem LLP (57) ABSTRACT

A building controller for controlling one or more building control components in a building, wherein the building controller is configured for bidirectional communication via a communication network between the building controller and the one or more building control components. The building controller can include a housing, a control unit, and a display unit. The control unit can execute an operating system and a building control application program having a control algorithm. The display unit may be configured to display at least one screen that facilitates user monitoring of diagnostic messages of the operating system of the control unit. Alternatively, or in addition, the display unit can be configured to display a screen to facilitate user entry of operating system parameters and/or a screen to facilitate entry of operating system commands for execution on by the control unit.

20 Claims, 11 Drawing Sheets

(51) Int. Cl.
*H04L 12/28* (2006.01)
*G05B 15/02* (2006.01)
*G05B 23/00* (2006.01)
*G06F 3/0484* (2013.01)

(52) U.S. Cl.
CPC .......... *G05B 19/0423* (2013.01); *G05B 23/00* (2013.01); *G06F 3/04847* (2013.01)

(56) References Cited

U.S. PATENT DOCUMENTS

| | | | |
|---|---|---|---|
| 5,978,902 | A | 11/1999 | Mann |
| 6,446,153 | B2 | 9/2002 | Cooper et al. |
| 6,823,223 | B2 | 11/2004 | Gonzales et al. |
| 6,907,300 | B2 | 6/2005 | O'Mahoney et al. |
| 7,047,350 | B2 | 5/2006 | Elledge et al. |
| 7,100,118 | B1 | 8/2006 | Klask |
| 7,228,265 | B2 | 6/2007 | Haley et al. |
| 7,349,761 | B1 | 3/2008 | Cruse |
| 7,487,182 | B2 | 2/2009 | Kataria et al. |
| 7,761,621 | B2 | 7/2010 | Hutchison et al. |
| 7,783,808 | B2 | 8/2010 | Hall et al. |
| 7,956,719 | B2 | 6/2011 | Anderson et al. |
| 2003/0158974 | A1 | 8/2003 | Herrod et al. |
| 2004/0260407 | A1* | 12/2004 | Wimsatt .......... G05B 15/02 700/19 |
| 2005/0080975 | A1 | 4/2005 | Elledge et al. |
| 2007/0069850 | A1 | 3/2007 | Anderson et al. |
| 2008/0126072 | A1 | 5/2008 | Hutchison et al. |
| 2008/0281472 | A1* | 11/2008 | Podgorny .......... F24F 11/0009 700/276 |
| 2008/0282253 | A1* | 11/2008 | Huizenga .......... G06F 9/4881 718/104 |
| 2010/0044449 | A1* | 2/2010 | Tessier .......... F24F 11/0086 236/94 |
| 2011/0204720 | A1* | 8/2011 | Ruiz .......... B60L 11/1816 307/66 |

OTHER PUBLICATIONS

"QNX Neutrino Realtime Operating System, Library Reference," for QNX Neutrino 6.5.0, 2010.
Honeywell, "WEBs-AX Security Controller," User's Guide, 266 pages, Jul. 2008.
Indramat, "Mannesmann Rexroth CLM 01.3-A Four-Axis Positioning Control," User's Manual, 349 pages, May 1998.
Novar, "Opus xcm.20R Supermarket Building Automation Controller," 2 pages, Aug. 2011.
Novar, "xcm Software Installation & Start-Up Guide," Part # xcm.10, xcm.20, xcm.10S, xcm.20R, pp. 1-42, May 12, 2011.
Novar, "xcm.10 Mounting and Wiring Instructions," 20 pages, May 15, 2007.
Novar, "xcm.10 NiagaraAX Installation & Start-up Guide," 40 pages, May 16, 2007.
Novar, "xcm.20R Mounting & Wiring Instructions," Part # XCM20R-C-XXXXX, XCM20R-G-XXXXX, pp. 1-60, Jul. 6, 2011.
Novar, "xcm.20R User Guide," Part # XCM20RC-XXXXX, XCM20R-G-XXXXX, pp. 1-27, Jul. 6, 2011.
Proliphix, Inc., "Internet Thermal Management, Thermal Management Series TM220, TM250," 2 pages, prior to Nov. 22, 2011.
Proliphix, Inc., "Proliphix IP Devices: HTTP API for NT Series Thermostats," Revision 1.11, 34 pages, Jun. 20, 2007.
Proliphix, Internet Managed Thermostat (IMT) Configuration Guide (IMT550c and IMT550w), Part No. 600-03001-550, Rev.1, 70 pages, Jul. 2010.
QNX Software Systems, "QNX Neutrino Realtime Operating System," Programmer's Guide, 403 pages, 2010.
QNX Software Systems, "QNX Neutrino RTOS," User's Guide, 443 pages, 2010.
Rexroth Bosch Group, "Rexroth IndraMotion MLC 03VRS," R911320103 Edition 01, 346 pages, 2007.
Siemens, "Site Controls Controller, Powerful On-Site Energy Management," 2 pages, Mar. 2011.
Tridium, "Jace 700," 3 pages, 2009.

* cited by examiner

BUILDING CONTROLLER WITH OPERATING SYSTEM INTERACTION THROUGH AN INTEGRATED DISPLAY

This application is a continuation of U.S. patent application Ser. No. 13/302,931, filed Nov. 22, 2011, and entitled "BUILDING CONTROLLER WITH OPERATING SYSTEM INTERACTION THROUGH AN INTEGRATED DISPLAY".

TECHNICAL FIELD

The disclosure is directed to building controllers, and more particularly, to a building controller that has an operating system that supports execution of one or more building control application programs.

BACKGROUND

Building control systems often include software and hardware that can be used to control one or more HVAC, lighting and/or refrigeration units, and/or perform energy management functions within a single building or for multi-site facilities. In some cases, the building control hardware can include stand-alone embedded controllers running building control application programs that are supported by an embedded operating system. In many cases, software packages running on a remote personal computer allow a technician to configure the building control application program for one or more sites, such as setting temperature set points or modifying alarm settings. Some building controllers include a graphical user interface to facilitate similar user access to the building application program settings (e.g., temperature set points and alarm settings).

SUMMARY

The disclosure is directed to a building controller, and more particularly, to a building controller that has an operating system that supports execution of one or more building control application programs.

In some instances, a building controller for controlling one or more building control components of a building is provided, wherein the building controller is configured for bidirectional communication via a communication network or the like between the building controller and the one or more building control components. In one illustrative example, the building controller may include a housing and a control unit situated in the housing. The control unit may be configured to execute an operating system having one or more operating system parameters. The control unit may also execute a building control application program having a control algorithm and one or more building control application parameters, wherein the operating system may support execution of the building control application program. The control algorithm of the building control application program can be configured to control the one or more building control components. In some cases, the building controller can include a display unit that can be secured relative to the housing and be visible from outside of the housing. The display unit can be configured to communicate with the control unit, and to display at least one screen that facilitates user monitoring of diagnostic messages of the operating system of the control unit. In addition, it is contemplated that the display unit can display at least one screen that facilitates user monitoring of diagnostic messages of the building control application program, if desired.

In some instances, the control unit can be configured to communicate with the display unit via a serial port steering circuit. The serial port steering circuit may be configured to provide messages from the control unit to the display unit, and from the control unit to a serial port accessible from outside of the housing.

In some cases, the building controller can be configured to display at least one screen that facilitates entry of one or more operating system commands that can then be submitted for execution on the control unit. An example of a building controller can include a display unit that can be configured to display at least one screen that facilitates user manipulation of one or more operating system parameters. Examples of such operating system parameters can include, but are not limited to, parameters for controlling communication between the control unit and one or more remotely located devices, parameters facilitating troubleshooting of how the building control application runs within the embedded operating system, and/or any other suitable operating system parameters.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings in which similar elements in different drawings are numbered the same. The description and the drawings, which are not necessarily to scale, depict several illustrative embodiments that are meant to be illustrative of the claimed disclosure, and are not intended to limit the scope of the disclosure.

Figure 1:
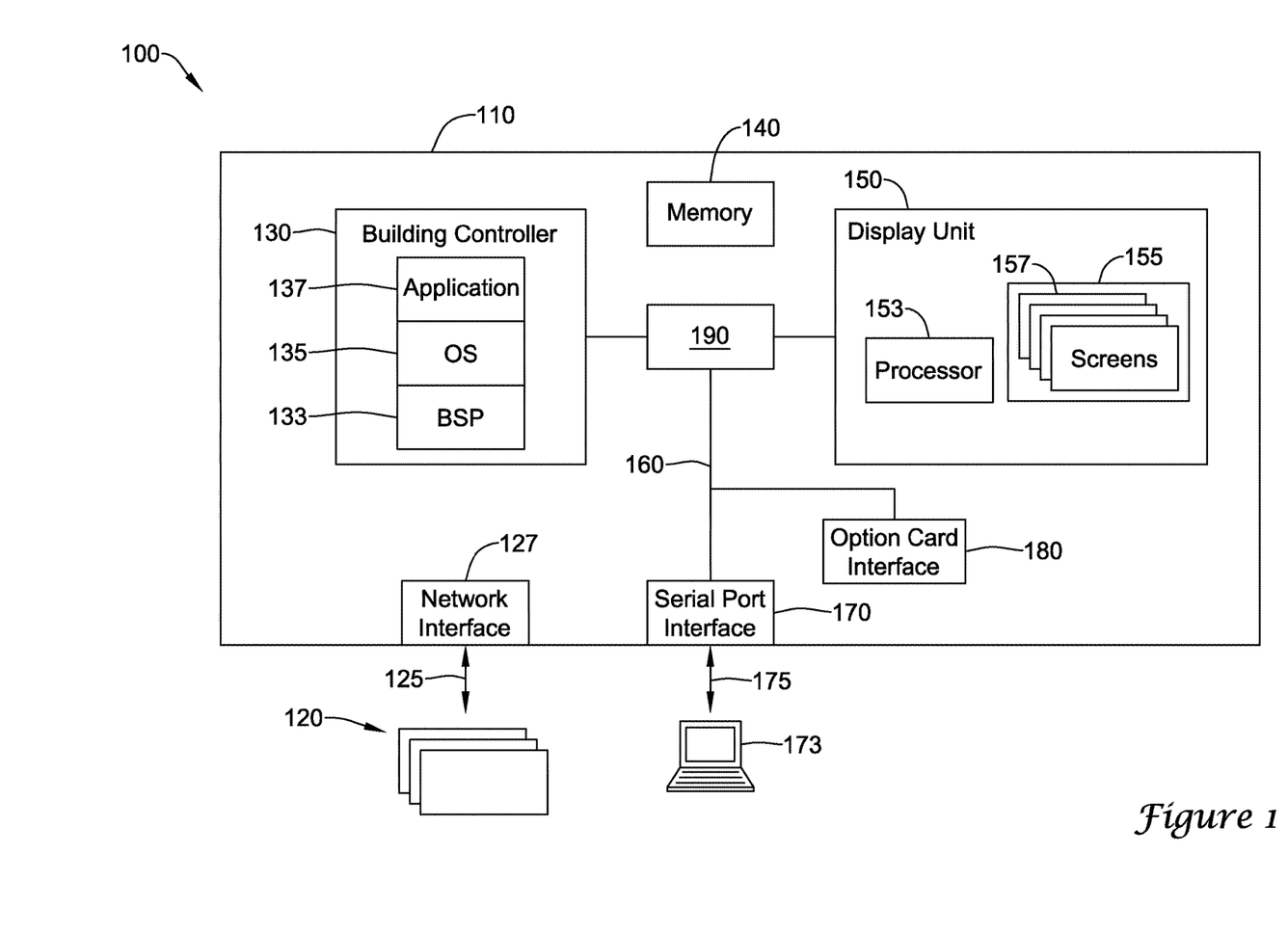
FIG. 1 is a schematic view of a portion of an illustrative building control system configured to control one or more building control components of one or more buildings.

FIG. 1 is a schematic view of a portion of an illustrative building control system 100 configured to control one or more building control components 120 of one or more buildings. In the example shown, the building control system 100 includes a building controller 110 configured to control one or more building control components 120 within a building (not explicitly shown). The building controller 110 can be communicatively coupled to the one or more building control components 120 using a communication link 125, such as via a network interface port 127 or any other suitable connection. The illustrative building controller 110 can include a processor 130, a memory 140 and an integrated display unit 150. The processor 130 can be configured to execute a board support package (BSP) 133, an operating system 135, and a building control application program 137. In some cases, the display unit 150 can include a viewing area 155, wherein the viewing area can be configured to display one or more screens 157. In some cases, the display unit 150 may include its own processor 153, but this is not required.

In some cases, the building controller 110 can include one or more communication buses 160. The processor 130 can be configured to communicate to at least one of the display unit 150, a serial communication port 170, and/or an option card interface 180 using a serial port steering circuit 190. In some cases, a computing device 173, such as a personal computer (PC) or laptop, can communicate with the building controller 110 via a communication link 175, if desired.

An example building control system 100 can include supervisory software such as the Novar Opus Supervisor application software, and one or more building controllers 110, such as one or more Novar XCM building controllers. In some cases, a user of the Novar Opus Supervisor can manage and communicate with tens, hundreds, thousands or more of remote site controllers from a centralized location, sometimes via a communication link 125 such as an intranet or the Internet. The Novar XCM in turn may manage and/or communicate with one, tens, hundreds or more building control components 120 within the site, which can perform real time control of building equipment such as HVAC units, lighting panels and/or refrigeration circuits.

In some instances, the building controller 110 can operate using shared hardware, such as an industrial computer (PC), but this is not required. For example, a PC-based building controller can include a PC card-based controller (e.g., ISA bus plug-in card, or PC-104 bus plug-in card) or a software-based controller running within a PC-based operating system (OS) (e.g. Microsoft Windows, Linux), or a real-time OS (RTOS) extension of the PC-based OS (e.g., RTX or RTAI.)

In some cases, the building controller 110 can be configured to control one or more building control components 120 at one or more geographical locations (e.g., within a single building, within multiple buildings at a single site, or within multiple buildings at two or more building sites.) Examples of the building control components 120 can include one or more HVAC controllers, lighting controllers, refrigeration controllers, or other similar devices including those to perform energy management functions. In another example, the building control system 100 can include devices configured to control or coordinate other facility management functionality, such as managing security systems and/or fire alarm systems. In some cases, the building controller 110 can be configured to communicate with the building control components 120 using a communication link 125 and a networking port 127. In some instances, the communication link 125 can include one or more standardized communication protocols (e.g., Ethernet, Ethernet/IP, BACnet, Modbus, LonWorks, etc.), or proprietary communication protocols, as desired.

In some cases, the building controller 110 can be configured as a dedicated building control device, such as an embedded controller. In an example, the building controller 110 can include a control unit, such as a processor 130 based on an embedded controller platform. Examples of embedded controller platforms can include Niagara Processor Module (NPM) based systems offered by Tridium Inc., (e.g., Tridium Java Application Control Engine (JACE) engine product family or other products based on the NPM). In some cases, building controller 110 can include an NPM based device (e.g., the Novar XCM20R, etc.). The building controller 110 can include a common housing, a processor circuit, (e.g., an NPM module), a display unit (e.g., an XCM.LCD embedded display platform), and a baseboard that can include, among other things, a power supply, input and output (I/O) module interfaces, programmable logic devices, and communications circuitry, as desired.

In one example, the processor 130 of the building controller 110 can be configured to operate using instructions stored in a machine-readable format on a memory, such as the memory 140. Examples of such instructions can include the BSP 133, the OS 135 and building control application program 137. The BSP 133, the OS 135 and the building control application program 137 can include ssociated parameters or data files associated to support the operation of the BSP 133, the OS 135 and the building control application program 137. The memory 140 can include any desired type of volatile and/or non-volatile memory such as, for example, static random access memory (SRAM), dynamic random access memory (DRAM), flash memory, read-only memory (ROM), and the like. In another example, the memory 140 can include any other medium which can be used to carry or store desired instructions in the form of machine-executable instructions or data structures that can be accessed by a machine with a processor (e.g., a CD-ROM, a DVD, a USB memory device, hard disk, etc.).

In some instances, the processor 130 can be configured to communicate with the display unit 150 via a communication bus (e.g., a serial bus), sometimes through serial port steering circuit 190. In one example, the building controller 110 can include two or more serial communication buses, wherein the first communication bus can be configured to provide a mechanism for transferring information between the processor 130 and the display unit 150, such as to facilitate the operation of the building control application program 137 (e.g., building control application parameters, alarms, i/o data, etc.). For example, the processor 130 may be communicatively coupled to the display unit 150 via a communication bus using a serial communication protocol (e.g., RS-232, RS-485, etc.) to facilitate user manipulation and viewing of building control application data such as manipulating alarm settings, viewing current and historical alarm information and/or manipulating temperature, humidity and/or other set points. A second communication bus (e.g., communication bus 160) may be configured to facilitate user interaction with the OS 135 or the BSP 133, such as to manipulate operating system parameter values, enter operating system commands, monitor BSP diagnostic information, or view operating system diagnostics. In some cases, a common communications bus or other communication path may be used, if desired.

In some instances, the processor 130 may communicate with two or more interfaces over the communication bus 160, such as by using the serial port steering circuit 190. The serial port steering circuit 190 can be configured to route data between the processor 130 and the external serial port interface 170, the option card interface 180 and/or the display unit 150. For example, the serial port steering circuit 190 can route messages from the processor 130 to a specified interface (e.g., the serial port interface 170, the option card interface 180 or the display unit 150), or broadcast messages to two or more of the connected interfaces, if desired. Further, and in some instances, the serial port steering circuit 190 can be used to route messages received from each of the serial port interface 170, the option card interface 180, and/or the display unit 150 to the processor 130.

In an example, the option card interface 180 can be used to facilitate communication between the processor 130 and an option card that is optionally included within the building controller 110. The option card interface 180 can be configured to support I/O cards or additional communication interfaces that can be used to gather additional information useful for the operation of the building control application program 137 or provide information to an external user interface. Such option cards can include, for example, a modem, a wireless Ethernet card, a discrete I/O card, a Fieldbus card, or any other suitable option card, as desired.

Figure 2:
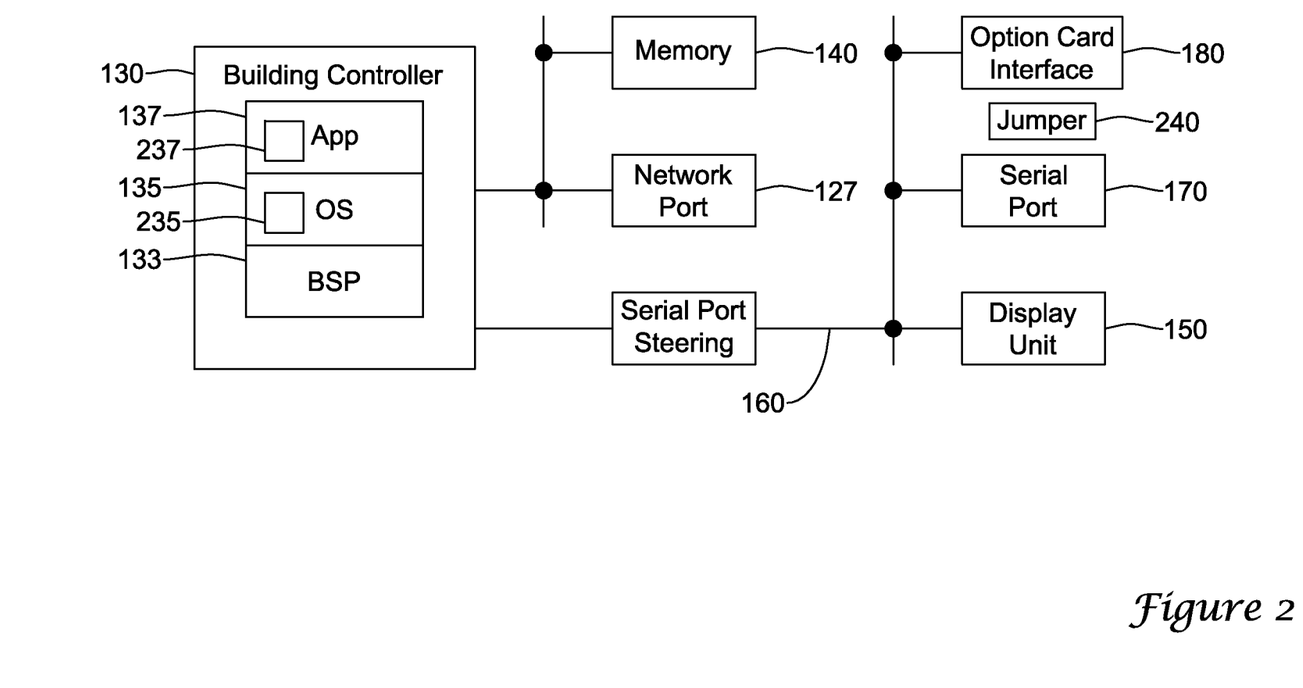
FIG. 2 is a schematic view of a portion of an illustrative building controller configured to display at least one screen that facilitates user monitoring of operating system information.

FIG. 2 is a schematic view of a portion of an illustrative building controller 110 configured to display at least one screen that facilitates user monitoring of operating system information. As discussed above, and in some instances, the processor 130 of the building controller 110 can be configured to execute one or more building control application programs 137, an operating system 135 which may support the execution of the one or more building control application program 137, and a board support package 133 to support the operation of the building controller hardware. In the example shown, the building control application program 137 can include application information 237 (e.g., parameter sets for configuring timers, temperature set points, alarm settings, etc.). The operating system 135 can include operating system information 235, such as operating system parameters (e.g., communication settings, system settings, etc.) and operating system diagnostics information. Building control application information 237 and the operating system information 235 can be stored in the memory 140, along with the instructions that comprise the building control application program 137, the OS 135, and the BSP 133. The processor 130 can be configured to communicate to at least one of the display unit 150, the serial port interface 170 and the option card interface 180 via the communication bus 160, sometimes using the serial port steering circuit 190. In some cases, the building controller 110 can include a jumper 240 to facilitate sharing of the communication bus 160 between, for example, the serial port interface 170 and the option card interface 180.

In some cases, the BSP 133 can include instructions and configuration files (e.g., memory size information, OS image information, map files, etc.) stored in the memory 140, such that the BSP 133 can initialize the processor 130 and other associated hardware (e.g., communication buses, the interrupt controller, the system clock, etc.). The BSP 133 can include a bootloader that can be executed at power on, such that the bootloader initializes the processor 130 and loads the OS instructions to be run on the processor 130. In some cases, the bootloader can be customized for the embedded system hardware used in the building controller 110. An example of the bootloader can be implemented such that the initialization process is completed as a series of discrete, identifiable steps. Each step can produce information about the initialization process (e.g., power on, bootloader starts, initialize minimum hardware, load OS kernel into memory, start OS, OS initialization of system, begin user application such as the building control application, etc.), and can be used to indicate the bootloader progress for debugging purposes.

Embedded systems, such as some building controllers 110, can be designed to use a Real-Time Operating Systems (RTOS). In one example, an RTOS (e.g., QNX) can be based on an OS standard such as POSIX, such that a standard application programming interface (API) can be used to design a scalable system. In some cases, an API can include, for example, functions (e.g., commands) and data structures, that can be used for process management, device I/O interfacing, file system management, inter-process communication, etc. In an example, the API can be designed using functions similar to a common programming language (e.g., ANSI C). The API can include functions or data structures that allow a user to customize the OS for operation with a specific hardware platform. Other features that can be included in the RTOS include real-time extensions (e.g., interrupt handling mechanisms, semaphores, process scheduling mechanisms, signal access mechanisms, timer mechanisms, etc.) and thread management functionality (e.g., creating threads, starting threads, stopping threads, etc.).

In some cases, the OS 135 can be an RTOS for an embedded system such as QNX, VxWorks, pSOS, VRTX, Nucleus, MC/OSII, and OSE. Such RTOSs typically can support preempted multi-tasking (e.g., prioritized task structure) for stopping execution of a certain task to execute another task having a higher priority. An RTOS can facilitate the processor 130 in responding in "real-time" (e.g., within microseconds) to local environmental or remote network generated events. An RTOS design can implement time-sharing scheduling with priority driven pre-emptive scheduling for the operation of one or more threads. In order for the RTOSs to support the preempted multi-tasking, each of the tasks typically must have an assigned priority. Real-time in an RTOS means that an execution end time of a certain task must be in an expected schedule, therefore higher priorities can be specified for these tasks relative to the priority of other tasks. For example, a task, such as a watchdog timer, must complete within a specified duration so its priority is set higher than other tasks (e.g. a serial communication task). If priorities of tasks are inverted, execution end times of the tasks cannot be in an expected schedule, resulting in ruining the real-time characteristic in an RTOS. The OS information 235 can include data (e.g., flags, semaphores, register data, etc.) that can provide information about the operation of one or more threads The OS 135 can be structured having a kernel that provides a specified level of functionality to support one or more processes (e.g., services) and/or device drivers. The processes and devices drivers can be designed to support running the building control application program 137 on the hardware of the building controller 110. For example, the kernel can be designed to support a file system management process, a user interface service (e.g., a service to support a graphical user interface), a communication service (e.g., a Ethernet communication service, a serial communication service, etc.), a scheduling service, a synchronization service, a message handling service, device drivers (e.g., serial port driver, an Ethernet port driver, a memory controller, etc.), and the like.

In one example, the OS 135 can include a service that facilitates user manipulation of at least part of the OS information 235 via a communication interface (e.g., a network port, serial port, etc.). For example, the building controller 110, such as a Tridium JACE product, can include a "serial shell" interface that can allow a user to manipulate at least some of the OS information 235 via the serial port interface 170. The serial shell interface can be used, for example, to reboot the controller or to manipulate communication parameters such as FTP/IP parameters (e.g., Hostname, Domain, IP address, Gateway address, subnet mask, etc.), Telnet parameters, file sharing parameters, licensing information, system time information, and/or any other suitable information. In some instances, the user may use a terminal emulation program on a PC 173 (e.g., HyperTerminal) using the communication link 175 (e.g., RS-232 or Telnet) connected to the serial port interface 170

In some instances, the processor 130 can be configured to share the communication bus 160 between two or more interfaces (e.g., the serial port interface 170 and the option card interface 180) using a jumper circuit 240. For example, the processor 130 may be configured to route messages to the serial port interface 170 when a jumper is installed in the jumper circuit 240, or to the option card interface 180 when the jumper is absent. Such a serial interface can be problematic during commissioning or installation. For example, manual intervention may be required to configure jumper settings on the controller and to connect an external computer via a serial connection. In some installations, using the serial interface to view or modify OS information may be impractical due to the required manual jumper settings, external laptop, serial cable and terminal emulation program. Further, due to the separate physical interface, much of the OS information, including the diagnostic information and commissioning information, may not be available to a user via the building control application program 137. However, such problems can be overcome by, for example, using the serial port steering circuit 190 with the communication bus 160 between the display unit 150 for manipulating the OS information 235 (e.g., parameters or diagnostics).

In one example, the serial port steering circuit 190 may be implemented within a programmable logic circuit (e.g., a PLD, a CPLD, an FPGA, a PLA, etc.) or with discrete elements (e.g., resistors, capacitors, transistors). In some cases, the serial port steering circuit 190 can be used to "steer" communications between two or more interfaces that use a common communication bus 160. For example, messages (e.g., serial shell communications) can be transmitted by the serial port steering circuit 190 to one or both of the serial port interface 170 and the display unit 150. The serial port steering circuit 190 can be configured such that the serial shell messages are transmitted to the display unit 150 of the building controller 110, sometimes whether or not a jumper is installed in the jumper circuit 240. Messages received by serial port steering circuit 190 from either the display unit 150 or the serial port interface 170 can be steered to the processor 130. In some cases, if messages are received from both the display unit 150 and the serial port interface 170, the serial port steering circuit 190 can include logic to determine precedence.

FIGS. 3-10 show screens that display illustrative menus that can be used to facilitate user interaction with OS information. For example, the viewing area 155 of the display unit 150 (see FIG. 1) can include one or more screens, such as screen 300, to facilitate user modification of OS information, user monitoring of OS diagnostics, and/or user entry of OS commands. In one example, the viewing area 155 of the display unit 150 can include a standard display with external buttons, and/or a touch screen display, as desired.

Figure 3:
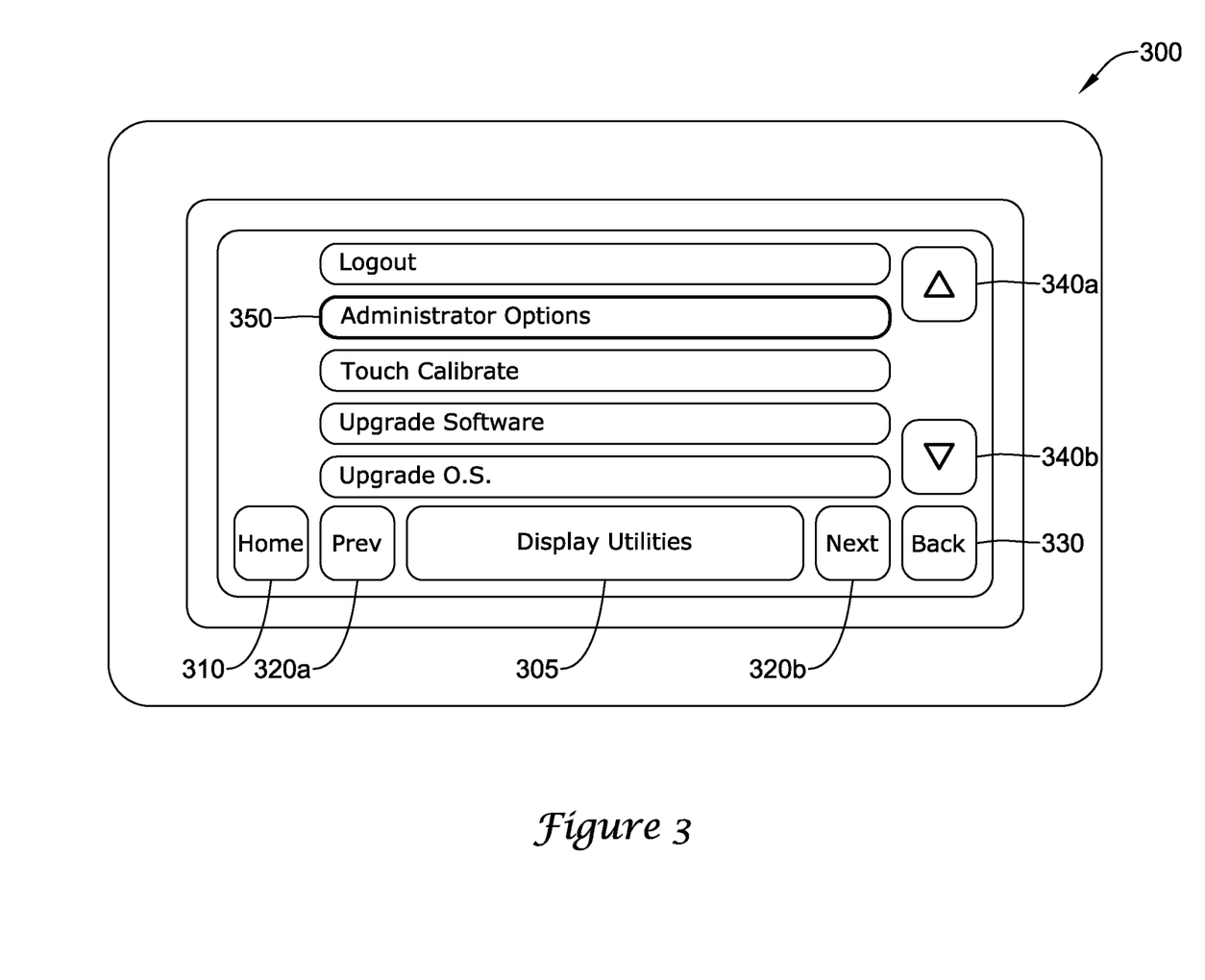
FIG. 3 shows a screen that displays an illustrative menu of a building controller that facilitates user access of administrator functionality of the building controller.

Turning now to FIG. 3, shows a screen 300 that displays an illustrative menu of a building controller that facilitates user access of administrator functionality of the building controller 110. Screen 300 can include a name field 305 and one or more navigation buttons to allow a user to view different screens, such as a home button 310, a previous screen button 320A, a next screen button 320B, and a back button 330. The illustrative screen 300 can be configured to allow a user to select from a list of sub-screens, such as by using one or more screen selection buttons, such as the Administrator Options button 350. A user can navigate through the list of sub-screens such as by using navigation buttons 340A, 340B. Upon selecting a desired sub-screen from the list of sub-screen options, the building controller displays the selected sub screen, such as screen 400 of FIG. 4. After the selection of a sub-screen, access to the sub-screen can be restricted such as by using a prompt for user verification (e.g., user name, password, etc.). When provided, such user verification can be done using another screen or pop-up window, as desired.

Figure 4:
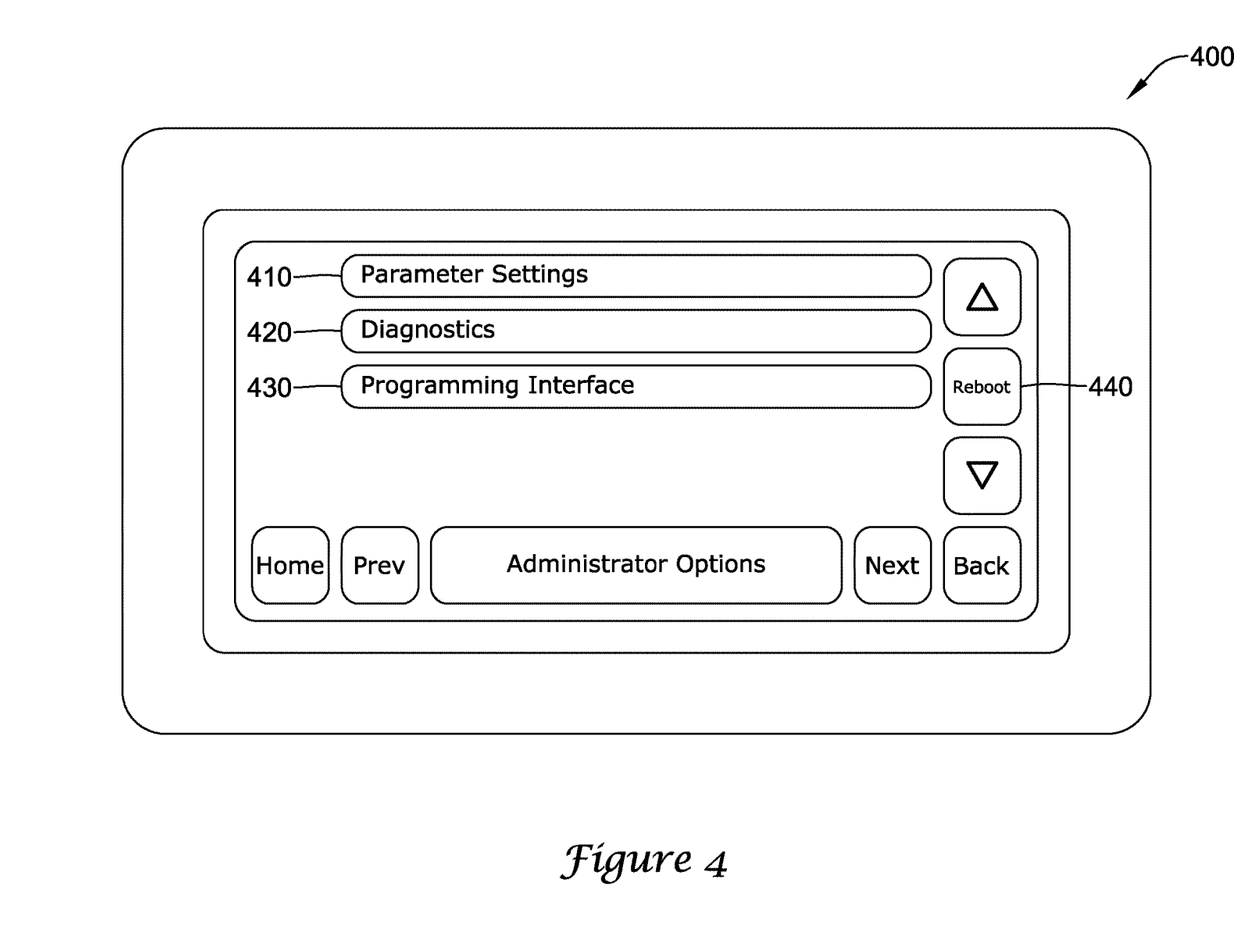
FIG. 4 shows a screen that displays an illustrative menu of a building controller that facilitates user monitoring of diagnostic messages, entering operating system commands, and/or manipulating operating system parameters of the building controller.

FIG. 4 is an example of a screen 400 configured to display a menu to facilitate user monitoring of diagnostic messages, entering operating system commands, or manipulating operating system parameters. In the example shown, the Administrator Options screen 400 can display a list of screen selection buttons such as a Parameter Settings button 410, a Diagnostics button 420, and a Programming Interface button 430. In some cases, the Administrator Options screen 400 can include a reboot button 440 to allow a user to reboot the building controller 110.

Figure 5:
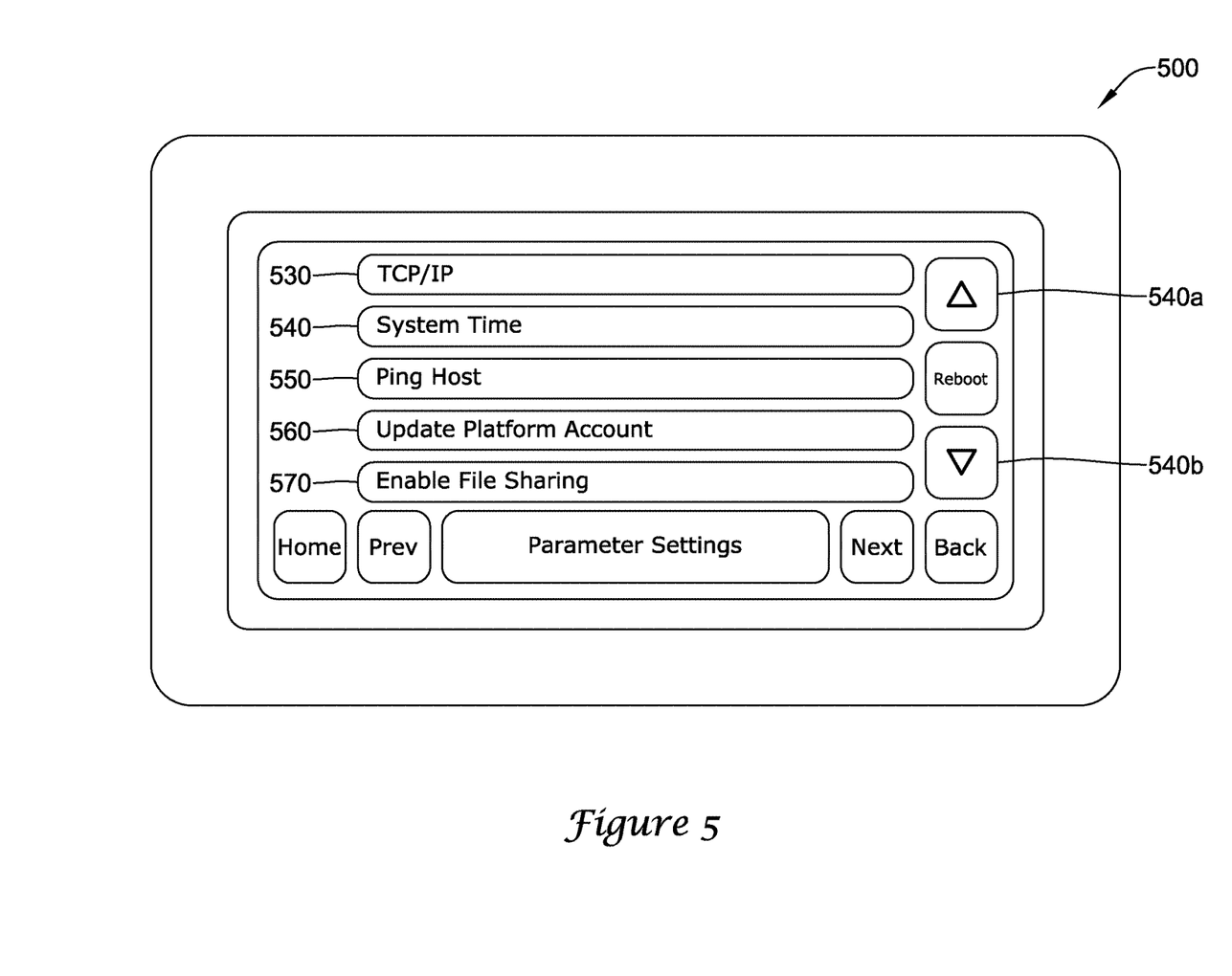
FIG. 5 shows a screen that displays an illustrative menu of a building controller that facilitates user manipulation of one or more operating system parameters of the building controller.

FIG. 5 is an example of a screen 500 configured to display a menu configured to facilitate user manipulation of one or more operating system parameters. Screen 500 can be displayed when the parameter settings button 410 if FIG. 4 is selected. Screen 500 displays a list of operating system parameters that can enable a user to easily modify, for example, communication settings (e.g., TCP/IP parameters, serial communication parameters, Telnet, etc.), enable file sharing (e.g., ftp), update licensing information, firmware management (e.g., update), perform maintenance function on the file system or memory (e.g., garbage collection), and/or manipulation any suitable operating system parameters.

The Parameter Settings screen 500 can display buttons configured to allow a user to manipulate the OS information 235 by functionality or as a parameter list. For example, the buttons can be arranged as a list (e.g., a TCP/IP button 530, a System Time button 540, a Ping Host button 550, an Update Platform Account button 560, or an Enable File Sharing button 570) that can be navigated using the navigation buttons 540A, 540B. The user can select a button on the screen 500 to prompt the display unit 150 to display the selected sub-screen, such as the TCP/IP screen 600 of FIG. 6. In one example, the selected sub-screen can allow a user to modify a single parameter or a list of parameters. In one example, some parameter settings can be used by the OS immediately (e.g., licensing information), while other parameter settings can be used by the OS after rebooting the control (e.g., TCP/IP parameters). In some cases, the display unit 150 can be configured to prompt a user to reboot the control when applicable, such as by using a screen or pop-up window, if desired.

Figure 6:
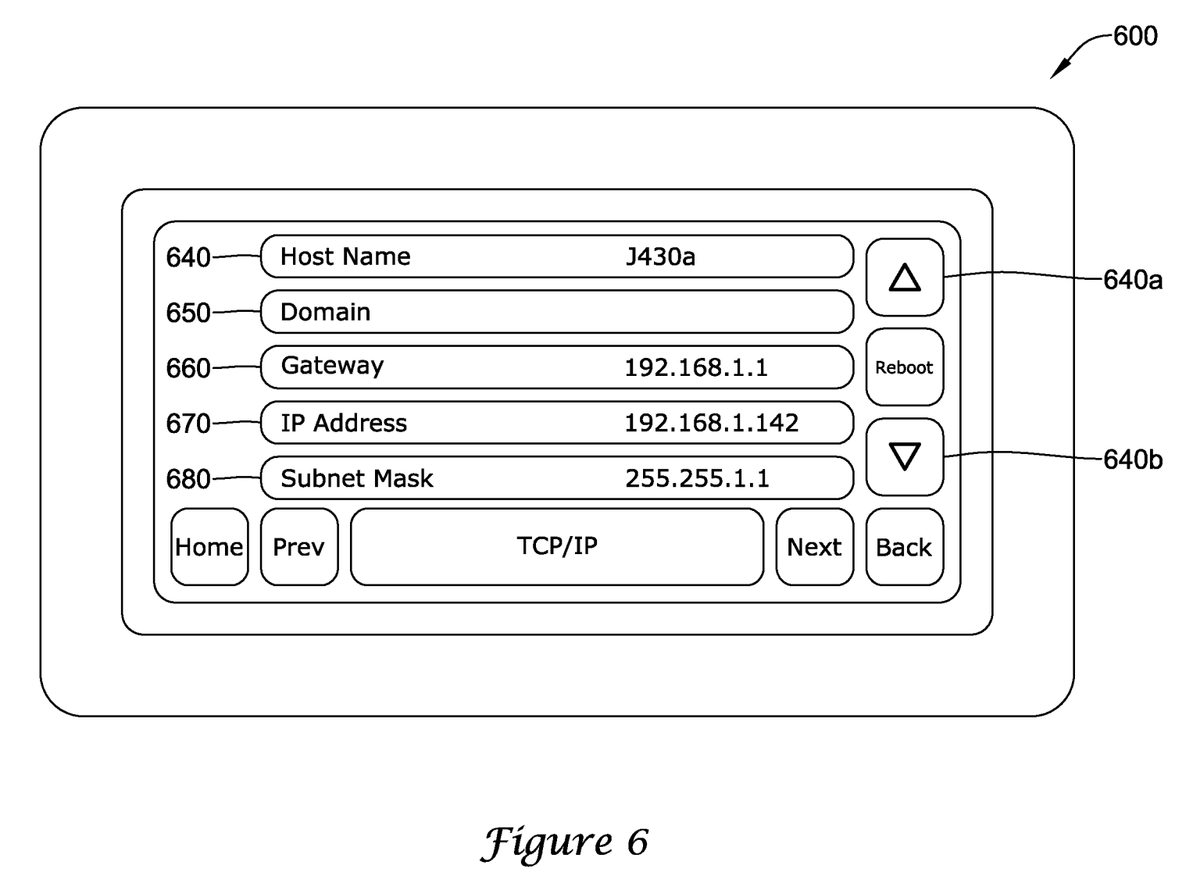
FIG. 6 shows a screen that displays an illustrative menu of a building controller that facilitates user manipulation of one or more operating system parameters of the building controller.

Referring specifically to FIG. 6, the illustrative menu may be used to facilitate user manipulation of one or more operating system parameters. For example, the display unit 150 can display TCP/IP screen 600, which may allow a user to manipulate the TCP/IP communication parameters, including a host name 640, a DHCP client, a domain name 650, a Gateway address 660, an IP address 670, a subnet mask 680, a broadcast address, a default router, and/or any other suitable TCP/IP communication parameters. The parameters can be displayed as a list, such as in screen 600, that is navigable using the buttons 640A, 640B. The parameter list can include buttons (e.g., the buttons 640-680) that prompt the display unit 150 to display either a subsequent screen or a pop-up window to allow the user to modify the selected parameter. Alternatively, the parameter list can include a list of editable fields that allow a user to manipulate the parameter values directly, or a combination of the editable fields and/or buttons as desired.

Figure 7:
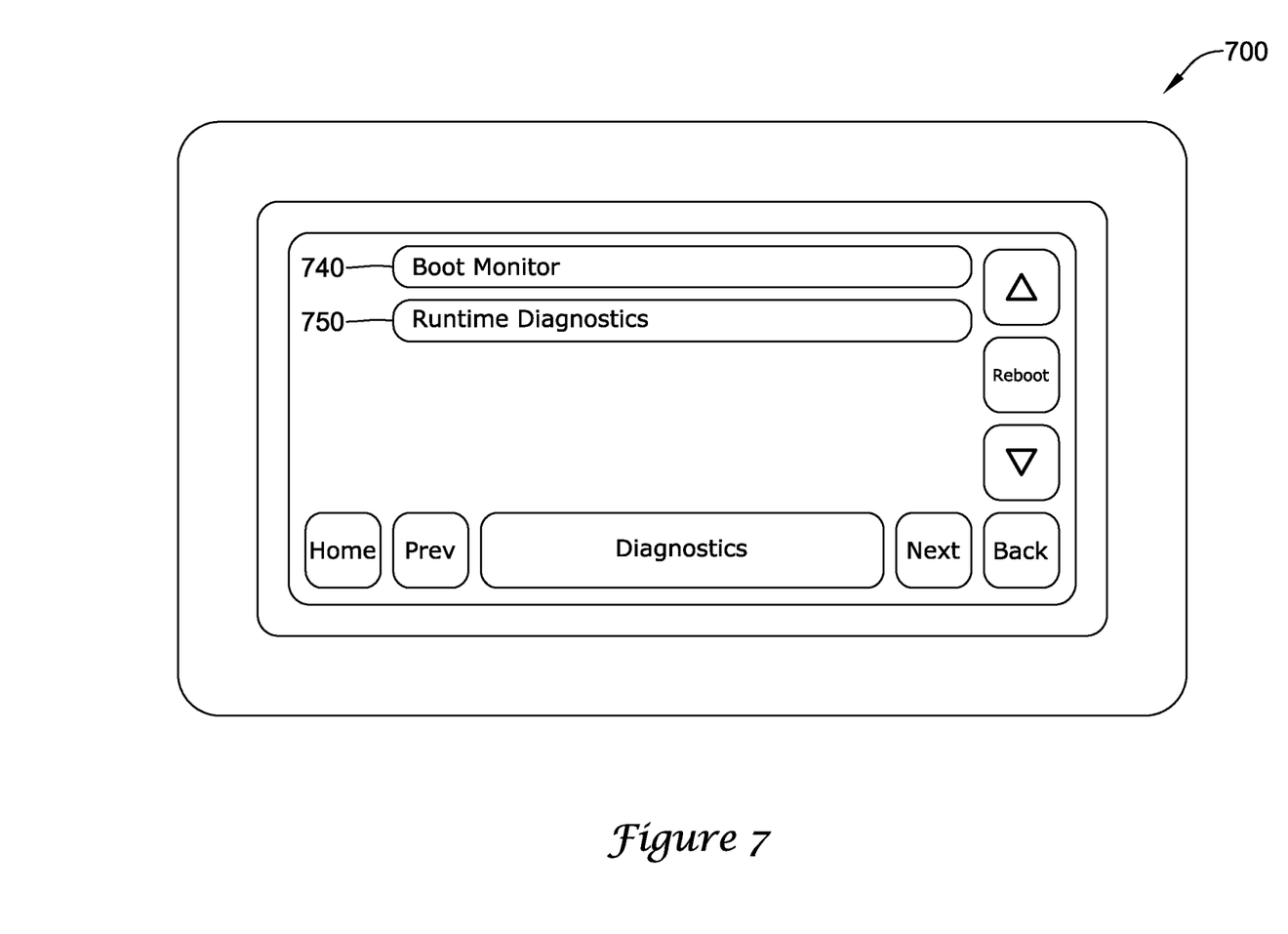
FIG. 7 shows a screen that displays an illustrative menu of a building controller that facilitates user monitoring of diagnostic messages of the operating system of the building controller.

FIG. 7 is an example of a screen 700 configured to display a menu to facilitate user monitoring of diagnostic messages of the operating system of the building controller 110. In the example shown, diagnostics screen 700 can include a list of diagnostic information about the operation of the OS 135 or BSP 133 available to the user, such as boot monitor information 740, or runtime diagnostic information 750 (e.g., CPU usage or Memory usage, File system integrity information, etc.). In one example, the boot monitor information can include information about the hardware, OS and/or BSP of the building controller during power up, such as information about the operation of the bootloader.

Figure 9:
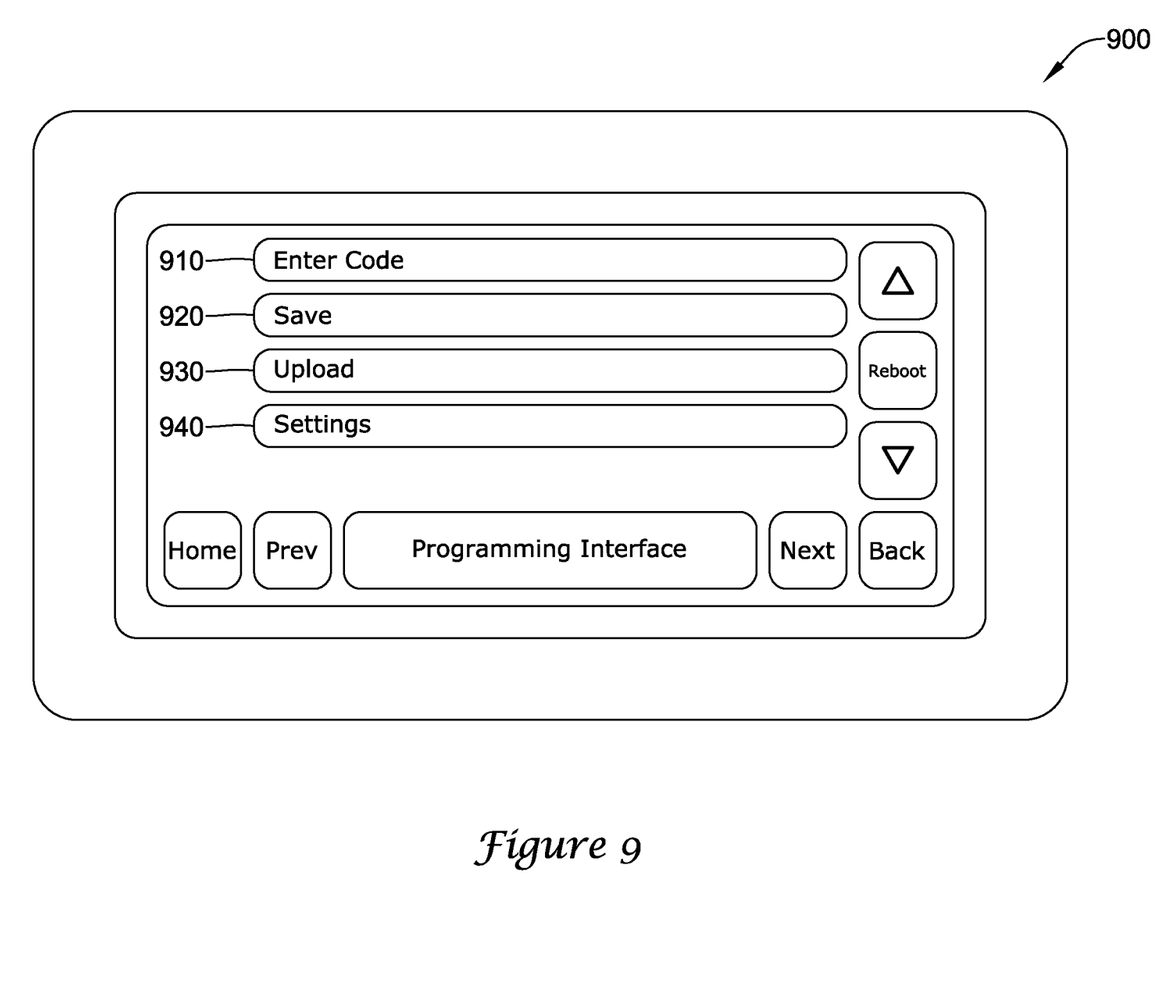
FIG. 9 shows a screen that displays an illustrative menu of a building controller that facilitates user entry of operating system commands of the building controller.

In some cases, the diagnostics screen 700 can include a selection button to allow a user to access debug information, which as can be inserted into the firmware before compiling the firmware, or by using the a programming interface such as that shown in FIG. 9. In one example, the debugging screen can be configured to display at least some information available to a programmer by using firmware debugging software, such as by displaying selected register values or debug messages within the firmware code. In an example, the diagnostic screen can include an option for displaying diagnostic log information stored over a duration of time, such as the boot monitor information or at least a portion of the runtime diagnostics information.

Figure 8:
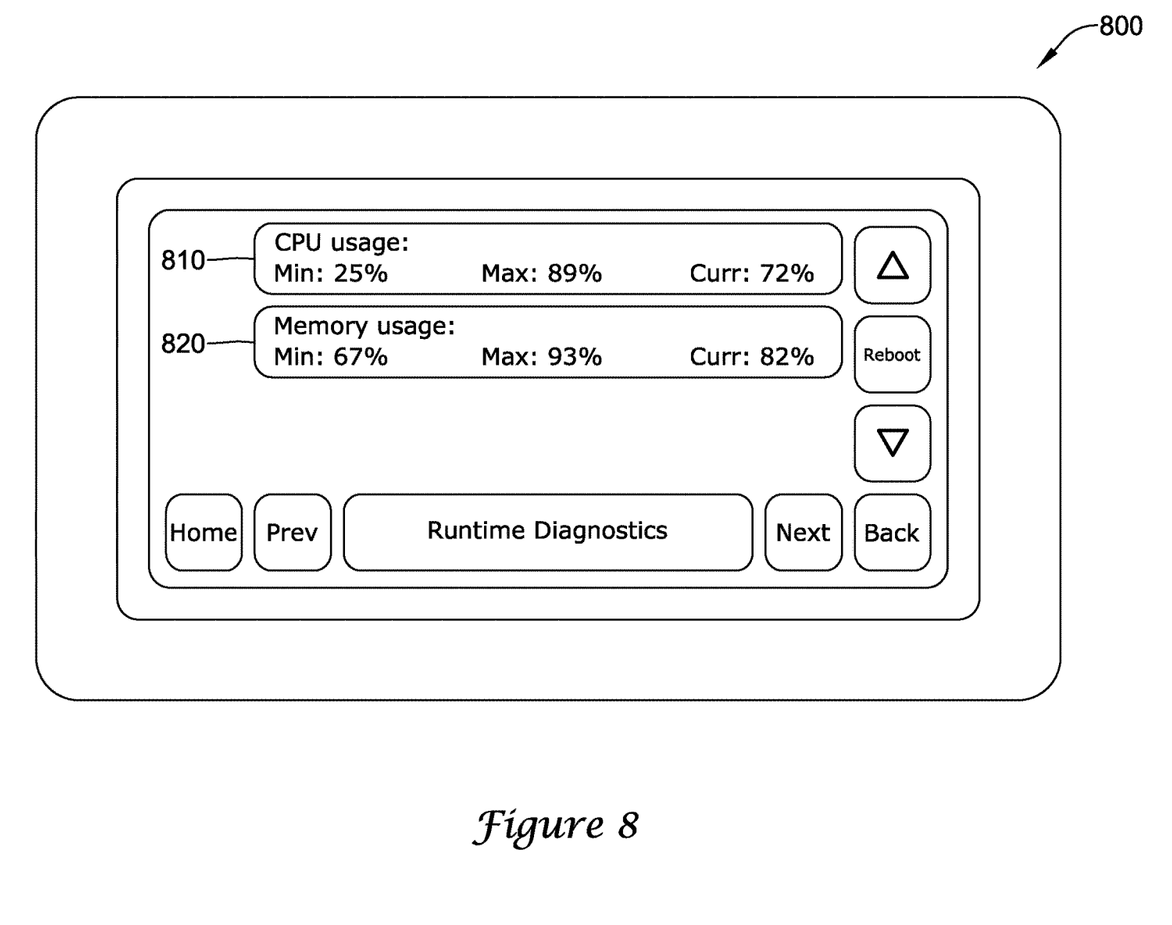
FIG. 8 shows a screen that displays an illustrative menu of a building controller that facilitates user monitoring of diagnostic messages of the operating system of the building controller.

FIG. 8 is an example of a screen 800 configured to display a menu to facilitate user monitoring of diagnostic messages of the operating system 135, and may be displayed when the Runtime Diagnostics button 750 of FIG. 7 is selected. In some cases, the runtime diagnostic information can include CPU usage information 810, memory usage information 820, faults, and/or any other suitable runtime diagnostics information. In some cases, the CPU usage information can include information about the operation of a processor, such as processor 130 (see FIG. 1), such as the available resources of the processor as a percentage of the total available resources. The CPU usage information 810 can include a minimum value, a maximum value, and/or the current usage value. In some cases, the CPU usage information can provide information about the operation of one or more threads running on the OS 135. For example, the CPU usage information may include timing, priority and usage information about one or more threads.

Memory usage information 820 can be used to provide information about the operational efficiency of the OS 135 and the building control application program 137. Memory in embedded systems is often fixed and not expandable, so efficient use of the memory 140 is desirable. In some cases, the runtime diagnostics screen 800 can include memory usage information 820, such as minimum usage, maximum usage, and current usage, as a percentage of the total available memory resources (e.g. memory 140).

FIG. 9 is an example of a screen 900 configured to display a menu configured to facilitate user entry of operating system commands. Screen 900 may be displayed when Programming Interface button 430 of FIG. 4 is selected. The example programming interface screen 900 can include buttons to facilitate the entry and management of the OS commands. For example, the buttons can include a code entry button 910, a Save button 920, a file transfer button 930, and/or a settings button 940. In some cases, the programming code entry button 910 can be configured to open a screen that facilitates a user in entering operating system commands, either as a single command, or a series of commands. The OS commands can be entered using a format similar to common programming languages (e.g., C, C++) or as assembly code. In some instances, the code entry screen can help a user select functionality from a set of commands, such as a list or a table, or to enter commands as text strings. In some cases, the display unit 150 can include functionality to compile the code prior to transferring the entered code to the processor 130. In some instances, the OS 135 can provide an interface that allows a user to associate the entered code to a specific task. For example, the specified task can be a task dedicated to run the entered code, or another task. In one example, OS parameters can be used to dictate how the processor 130 will utilize the entered code, such as assigning the entered code to a task, determining whether the code is run once or continuously, or whether the entered commands are run at the beginning of the assigned task execution, or at the end of the task execution.

In some cases, the user can select the save button 920 to save the entered code to the memory 140. In some instances, the save button 920 may be used to open a screen that allows a user to save the entered code as a file, which can be store within the file system in memory 140. The transfer button can be used to transfer code between the building controller 110 and another device. For example, the transfer button can be used to upload a file from a device, such as a USB drive, to the building controller 110, or to transfer a file stored on the building controller 110 to, for example, the USB drive. In some cases, the transfer button 930 can be used to open a screen to transfer a file over a network, such as by using FTP. For example, in some cases, a user can transfer a file containing commands, or code, to be executed on the processor 130, such as code developed on another building controller 110, or a patch, such as to update the building controller firmware.

Figure 10:
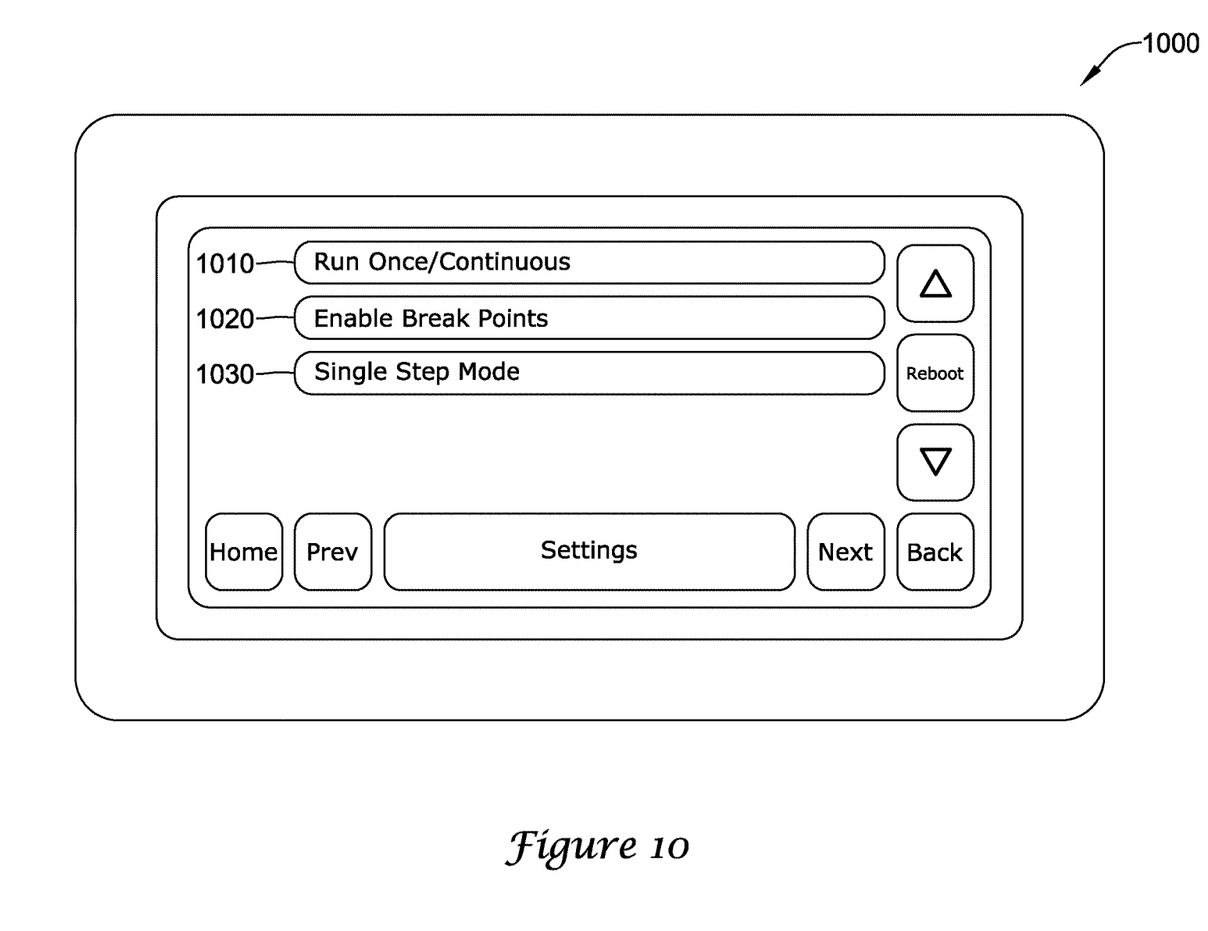
FIG. 10 shows a screen that displays an illustrative menu of a building controller that facilitates the operation of the user entered operating system commands.

FIG. 10 is an example of a screen 1000 configured to display a menu to facilitate the operation of the user entered operating system commands. Screen 1000 may be displayed when Settings button 940 of FIG. 9 is selected. In the example shown, the settings screen can display buttons used to configure how OS commands entered by the user via the display unit 150 of the building controller 110 are run by the processor 130. In some cases, the settings screen can be configured to manipulate OS information, such as parameters, that can allow a user to customize the operation of the user entered OS commands. For example, a user can determine whether the commands will run once, or run continuously, such as by using the Run Once/Continuous button 1010. In some cases, the OS commands entered by the user can include commands useful for debugging, such as to set a break point in the task execution. The enable break points button 1020 can be used to enable/disable the breakpoints, such that a user can force the processor execution to stop at a specified point. Other debugging options can be made available to the user, such as via the single-step mode button 1030, where the user can monitor the code operation by stepping through a single command, or a series of commands.

Figure 11:
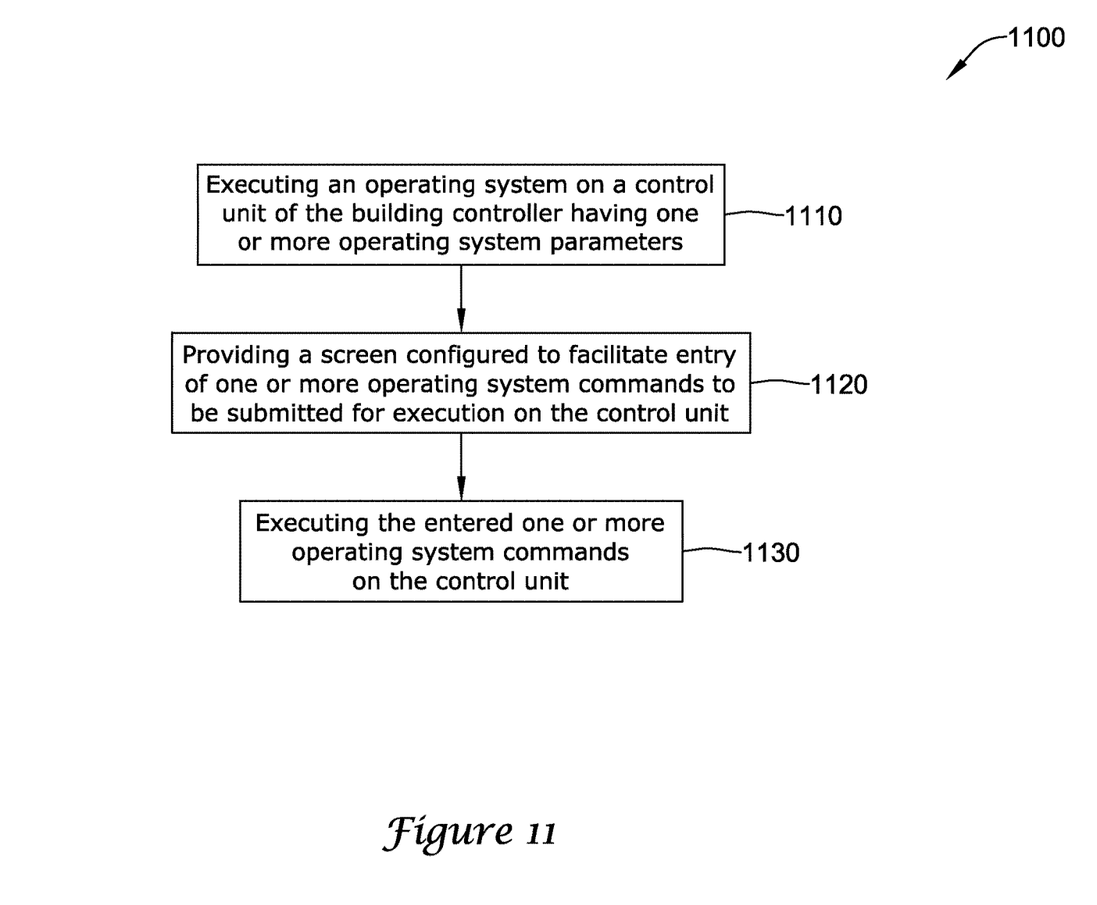
FIG. 11 is a flow chart of an illustrative method for facilitating user manipulation of operating system information of a building controller.

FIG. 11 is a flow chart of an illustrative method 1100 for facilitating user manipulation of operating system information of a building controller. At 1110, a processor, such as processor 130, executes an operating system (e.g., QNX) that can include OS information 235, such as one or more operating system parameters, and/or diagnostic information about the operation of the OS 135 and/or the BSP 133. As discussed above, the OS can include features (e.g., OS instructions, multiple threads, communication functions, etc.) that can be used to facilitate the operation of the building control application program 137.

At 1120, the display unit 150 communicatively coupled to the processor 130 may display at least one screen 157 on the viewing area 155 that is configured to facilitate the entry of at least one or more operating system commands to be executed by the processor 130. In one example, the display unit 150 may display at least one screen to allow a user to manipulate one or more operating system parameters (e.g., communication parameters, troubleshooting parameters, etc.).

At 1130, the display unit 150 may provide the operating system command entered by the user via enter code option 910 to the processor 130 for execution. In one example, the display unit 150 can display at least one screen configured to allow a user to monitor diagnostic messages about the operation of the OS 135. In some cases, an OS system parameter manipulated by a user via a first screen 157 on the viewing area 155 can be used with an operating system command entered using a second screen 157, where a third screen 157 can display a diagnostic message based on the execution of the OS command and the OS parameter data.

Those skilled in the art will recognize that aspects of the present disclosure may be manifested in a variety of forms other than the specific examples (e.g., embodiments) described and contemplated herein. Accordingly, departure in form and detail may be made without departing from the scope and spirit of the present disclosure as described in the appended claims.

What is claimed is:

1. A building controller for controlling one or more building control components of a building, comprising:

a housing;

a port accessible from outside of the housing;

a control unit situated in the housing and operatively coupled to the port, the control unit executing an operating system and further executing a building control application program, wherein the operating system supports execution of the building control application program;

the building control application program implements a control algorithm that is configured to generate control signals to control one or more building control components via the port; and a display unit secured relative to the housing and visible from outside of the housing, the display unit is in operative communication with the control unit, wherein the building control application program is configured to display on the display unit at least one screen that allows a user to select one or more operating system commands through the building control application program for execution by the operating system of the control unit.

2. The building controller of claim 1, further comprising:

a data port secured relative to the housing and accessible from outside of the housing;

a data port steering circuit situated in the housing; and wherein the control unit is configured to direct messages from the control unit to the display unit and to the data port via the data port steering circuit.

3. The building controller of claim 2, wherein the data port steering circuit is further configured to direct information received from the data port to the control unit and to steer information received from the display unit to the control unit.

4. The building controller of claim 1, wherein the one or more building control components comprise one or more HVAC control units, refrigeration control units and lighting control units.

5. The building controller of claim 1, wherein the operating system includes one or more operating system parameters, and wherein the display unit is configured to display at least one screen that facilitates user manipulation of one or more of the operating system parameters.

6. The building controller of claim 5, wherein user manipulation of at least one of the operating system parameters enables user monitoring of diagnostic messages of the operating system.

7. The building controller of claim 6, wherein the diagnostic messages of the operating system include at least one of boot monitor messages, and operating system messages that are issued as a result of execution of the building control application program.

8. The building controller of claim 1, wherein the building controller is an embedded building controller running an embedded operating system, and wherein the embedded operating system is a real-time operating system.

9. The building controller of claim 1, wherein the display unit includes a touch screen display.

10. The building controller of claim 1, wherein the display unit is configured to display at least one screen that facilitates user manipulation of one or more communication parameters for controlling communication between the control unit and one or more remotely located devices via the port.

11. The building controller of claim 10, wherein the one or more remotely located devices comprises one or more of the building control components.

12. A building controller for controlling one or more building control components of a building, comprising:
   a housing;
   a control unit situated in the housing, the control unit executing an operating system and further executing a building control application program, wherein the operating system supports execution of the building control application program; and
   a display unit secured relative to the housing and visible from outside of the housing, the display unit is in operative communication with the control unit, wherein the building control application program is configured to display on the display unit at least one screen that allows a user to initiate display of diagnostic messages of the operating system of the control unit through the building control application program.

13. The building controller of claim 12, further comprising:
   a data port secured relative to the housing and accessible from outside of the housing;
   a data port steering circuit situated in the housing; and
   wherein the control unit is configured to direct messages from the control unit to the display unit and to the data port via the data port steering circuit.

14. The building controller of claim 12, wherein the one or more building control components comprise one or more HVAC control units, refrigeration control units and lighting control units.

15. The building controller of claim 12, wherein the operating system includes one or more operating system parameters, and wherein the display unit is further configured to display at least one screen that facilitates user manipulation of one or more of the operating system parameters.

16. The building controller of claim 15, wherein the user monitoring of diagnostic messages of the operating system is enabled by user manipulation of at least one of the operating system parameters.

17. The building controller of claim 12, wherein the diagnostic messages of the operating system include at least one of boot monitor messages, and operating system messages that are issued as a result of execution of the building control application program.

18. The building controller of claim 12, wherein the building controller is an embedded building controller running an embedded operating system, and wherein the embedded operating system is a real-time operating system.

19. A building controller for controlling one or more building control components of a building, comprising:
   a housing;
   a controller situated in the housing for executing an operating system and a building control application program, wherein the operating system supports execution of the building control application program;
   a display unit secured relative to the housing and visible from outside of the housing, the display unit is in operative communication with the controller, wherein the building control application program is configured to display on the display unit at least one screen that acts as a user interface to the operating system of the controller, wherein the at least one screen of the building control application program allows a user to: designate one or more operating system commands for execution by the operating system of the control unit through the building control application program; initiate the display of diagnostic messages of the operating system of the control unit through the building control application program; and/or change one or more operating system parameters through the building control application program; and
   an output for providing one or more control signals for controlling one or more building control components.

20. The building controller of claim 19, wherein the operating system includes one or more operating system parameters, and wherein the display unit is configured to display at least one screen that facilitates user manipulation of one or more of the operating system parameters.

* * * * *